United States Patent
Pu et al.

(10) Patent No.: US 10,594,043 B2
(45) Date of Patent: *Mar. 17, 2020

(54) ANTENNA DEVICE AND SYSTEM HAVING ACTIVE MODULES

(71) Applicant: HUAWEI TECHNOLOGIES CO., LTD., Shenzhen, Guangdong (CN)

(72) Inventors: Tao Pu, Shanghai (CN); Pinghua He, Shenzhen (CN); Mengda Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

This patent is subject to a terminal disclaimer.

(21) Appl. No.: 15/458,266

(22) Filed: Mar. 14, 2017

(65) Prior Publication Data

US 2017/0187122 A1 Jun. 29, 2017

Related U.S. Application Data

(63) Continuation of application No. 14/489,997, filed on Sep. 18, 2014, now Pat. No. 9,627,774, which is a
(Continued)

(51) Int. Cl.
*H01Q 21/00* (2006.01)
*H01Q 5/50* (2015.01)
(Continued)

(52) U.S. Cl.
CPC ......... *H01Q 21/0006* (2013.01); *H01Q 1/246* (2013.01); *H01Q 3/26* (2013.01);
(Continued)

(58) Field of Classification Search
None
See application file for complete search history.

(56) References Cited

U.S. PATENT DOCUMENTS 6,529,166 B2 3/2003 Kanamaluru
6,667,714 B1 12/2003 Solondz
(Continued)

FOREIGN PATENT DOCUMENTS

CN 1553725 12/2004
CN 1613167 5/2005
(Continued)

OTHER PUBLICATIONS

Extended European Search Report dated Feb. 6, 2015 in corresponding European Patent Application No. 12741935.6.
(Continued)

*Primary Examiner* — Trinh V Dinh
(74) *Attorney, Agent, or Firm* — Kilpatrick Townsend & Stockton LLP

(57) ABSTRACT

An antenna device includes: an antenna array configured to radiate or receive an electromagnetic wave signal; a feed network configured to connect the antenna array and a signal multiplexer; at least one signal multiplexer configured to divide one path of a signal from the feed network into at least two paths of a signal, or combine at least two paths of a signal to one path of a signal and transmit the one path of a signal to the feed network; and at least two interface modules connected to an active module and configured to receive a signal sent from the passive module or the active module, or send a signal to the active module. The antenna device can be used for sharing the antenna array and other parts in the active antenna systems.

6 Claims, 9 Drawing Sheets

Related U.S. Application Data continuation of application No. PCT/CN2012/072610, filed on Mar. 20, 2012.

(51) Int. Cl.
*H01Q 23/00* (2006.01)
*H01Q 25/00* (2006.01)
*H01Q 3/26* (2006.01)
*H01Q 1/24* (2006.01)
*H04B 17/12* (2015.01)
*H04B 17/21* (2015.01)

(52) U.S. Cl.
CPC .............. *H01Q 3/267* (2013.01); *H01Q 5/50* (2015.01); *H01Q 23/00* (2013.01); *H01Q 25/00* (2013.01); *H04B 17/12* (2015.01); *H04B 17/21* (2015.01)

(56) References Cited

U.S. PATENT DOCUMENTS

| | | | | |
|---|---|---|---|---|
| 8,417,295 | B2* | 4/2013 | Fox .......................... | H01Q 3/28 342/359 |
| 9,252,485 | B2 | 2/2016 | Haskell et al. | |
| 9,277,590 | B2 | 3/2016 | Kokkinos et al. | |
| 9,627,774 | B2* | 4/2017 | Pu .......................... | H01Q 1/246 |
| 2004/0252055 | A1* | 12/2004 | Thomas ................. | H01Q 1/246 342/372 |
| 2005/0052332 | A1 | 3/2005 | Chiang et al. | |
| 2008/0102760 | A1 | 5/2008 | McConnell et al. | |
| 2009/0309799 | A1 | 12/2009 | Hossain | |
| 2010/0029332 | A1* | 2/2010 | Fox .......................... | H01Q 3/28 455/561 |
| 2011/0159877 | A1 | 6/2011 | Kenington et al. | |
| 2012/0263077 | A1 | 10/2012 | Xu et al. | |
| 2014/0313095 | A1* | 10/2014 | Pu .......................... | H01Q 1/246 343/836 |
| 2017/0104270 | A1* | 4/2017 | Wang .................. | H01Q 21/0025 |
| 2017/0187122 | A1* | 6/2017 | Pu .......................... | H01Q 1/246 |

FOREIGN PATENT DOCUMENTS

| | | |
|---|---|---|
| CN | 101523759 | 9/2009 |
| CN | 101777932 | 7/2010 |
| GB | 2 444 980 | 6/2008 |
| WO | WO 02/07254 | 1/2002 |
| WO | WO 03/043127 | 5/2003 |
| WO | WO 2009/051558 | 4/2009 |
| WO | WO 2012/016941 | 2/2012 |

OTHER PUBLICATIONS

PCT International Search Report dated Dec. 27, 2012 in corresponding International Patent Application No. PCT/CN2012/072610.

Chinese Search Report dated Aug. 12, 2013 in corresponding Chinese Patent Application No. 2012800005042.

Chinese Office Action dated Sep. 4, 2013 in corresponding Chinese Patent Application No. 201280000504.2.

Office Action dated Jul. 5, 2016 in corresponding U.S. Appl. No. 14/489,997.

Notice of Allowance dated Dec. 14, 2016 in corresponding U.S. Appl. No. 14/489,997.

U.S. Appl. No. 14/489,997, filed Sep. 18, 2014, Tao Pu et al., Huawei Technologies Co., Ltd.

\* cited by examiner

_(54)_ ANTENNA DEVICE AND SYSTEM HAVING ACTIVE MODULES

CROSS-REFERENCE TO RELATED APPLICATIONS

This application is a continuation of U.S. patent application Ser. No. 14/489,997, filed on Sep. 18, 2014, which is a continuation of International Application No. PCT/CN2012/072610, filed on Mar. 20, 2012, all of the afore-mentioned patent applications are hereby incorporated by reference in their entireties.

FIELD OF THE INVENTION

The present invention relates to the field of radio transmission, and in particular, to an antenna device and system.

BACKGROUND OF THE INVENTION

A base station antenna is configured to convert a radio frequency signal into an electromagnetic wave signal and radiate the electromagnetic wave signal to space, or, receive an electromagnetic wave signal transmitted from a terminal, convert the electromagnetic wave signal into a radio frequency signal, and output the radio frequency signal to a base station.

Each base station antenna controls an area with a certain range (referred to as a sector or a cell) and radiates or receives an electromagnetic wave within the area. A radiation radius may be controlled through a method of controlling a downtilt of a major lobe, where the larger the downtilt of the major lobe is, the smaller the radiation radius is. Further, a center of an area covered by the sector of the cell may be controlled by controlling a horizontal direction of the major lobe of the antenna, and a horizontal coverage range of the radiation may be controlled by controlling the horizontal beam width of the major lobe.

An active antenna system (AAS) refers to a system formed by integrating an active transceiver and an antenna, which is a new type of a base station architecture. The AAS, as compared with a conventional antenna system, reduces the feeder loss, makes it more convenient to adjust a wave beam of an antenna, and meanwhile has certain advantages at the utilization rate of frequency spectrum resources. Moreover, iron towers or station locations, as finite resources (for example, load bearing of an iron tower is finite and roof space is finite; European and American residents, due to health awareness, are very sensitive to the number and the size of antennas, and the charge of a station location is strongly related to the charge of an owner, so only a small amount of antennas can be installed on a tower or a station location with the foregoing limitation factors), are expected to be shared or reused as far as possible.

However, in the prior art, one antenna only can be independently used in a passive antenna system or in an active antenna system rather than be used in the active antenna system and the passive antenna system at the same time. Alternatively, two types of antennas are only integrated into the same antenna device. Two groups (columns) of antennas completely independent of each other are set in the same antenna, and the adjustments of the downtilts of the two groups (columns) of antennas do not affect each other, but elements are not shared therein, so antenna resources are wasted.

SUMMARY OF THE INVENTION

The present invention provides an antenna device and system, capable of being used by an active antenna system, and also by a passive antenna system, sharing an antenna array and other parts (such as a feed network) in the active and passive antenna system.

The present invention, in one aspect, provides an antenna device. The antenna device includes:

an antenna array, configured to radiate or receive an electromagnetic wave signal;

a feed network, configured to connect the antenna array and a signal multiplexer;

at least one signal multiplexer, where each signal multiplexer, including a combiner port and at least two divider ports, is configured to divide one path of signal from the feed network into two paths of signal, or combine at least two paths of signal to one path of signal and transmit the one path of signal to the feed network; and at least two interface modules, where each of the interface modules, connected to a passive module or an active module, is configured to receive a signal sent from the passive module or the active module, or send a signal to the passive module or the active module; where, the at least two divider ports of each signal multiplexer at least include a first port and a second port; the at least two interface modules at least include a first interface module and a second interface module; the first port is connected to the first interface module and the second port is connected to the second interface module, so as to send a signal output by the first port, through the first interface module, to the passive module or the active module that is connected to the first interface module, and send a signal output by the second port, through the second interface module, to the passive module or the active module that is connected to the second interface module, or, send, to each signal multiplexer through the first port and the second port, a signal output by the passive module or the active module that is connected to the first interface module and a signal output by the passive module or the active module that is connected to the second interface module.

In another aspect, the present invention further provides an antenna system. The antenna system includes an antenna device as stated in the foregoing.

In still another aspect, the present invention further provides a communication system including an antenna system as stated in the foregoing.

The implementations of the technical solutions of the present invention have the following beneficial effects. In the antenna device provided in the present invention, a new antenna structure is provided. Multiple interface modules are set in the antenna device at the same time. Moreover, the interface modules may be connected, according to requirements, to an active module or a passive module to enable the antenna device to be combined with the active module or the passive module, so as to form an active antenna system or a passive antenna system and enable the active antenna system or the passive antenna system to share resources such as an antenna array or a feed network. The resources are shared at the same time when the extensibility of the antenna is improved.

BRIEF DESCRIPTION OF THE DRAWINGS

To illustrate the technical solutions in the embodiments of the present invention or in the prior art more clearly, the following briefly describes the accompanying drawings needed for describing the embodiments or the prior art. Apparently, the accompanying drawings in the following descriptions merely show some embodiments of the present invention, and persons skilled in the art may derive other drawings from the accompanying drawings without creative efforts.

DETAILED DESCRIPTION OF THE EMBODIMENTS

The following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative efforts shall fall within the protection scope of the present invention.

The technical solutions of the present invention may be applied to various communication systems, for example, the global system of mobile communication (GSM), the code division multiple access (CDMA) system, the wideband code division multiple access wireless (WCDMA), the general packet radio service (GPRS), the long term evolution (LTE), and the like.

The base station may be a base station in the GSM or the CDMA (BTS), may also be a base station in the WCDMA (NodeB), and may further be an evolved base station in the LTE (eNB or e-NodeB, evolved Node B), which is not limited in the present invention.

In the embodiments of the present invention, an antenna device used in an AAS is referred to as an active antenna for short, an antenna device not used in an AAS is referred to as a passive antenna for short, and a non-AAS is referred to as a passive antenna system.

The technical solutions in the embodiments of the present invention can enhance the extensibility of the antenna. That is, the antenna device in the embodiments of the present invention can be used in an active antenna system, namely, the AAS, also can be connected to a remote radio unit (RRU) or a non-distributed base station and be used as a passive antenna, and further can extend a frequency band and a system format very well, so that in an antenna system, a passive antenna system and an active antenna system can simultaneously share, in addition to sharing elements of an antenna array, other parts of the antenna, for example, a feed network and a Butler matrix.

Figure 1:
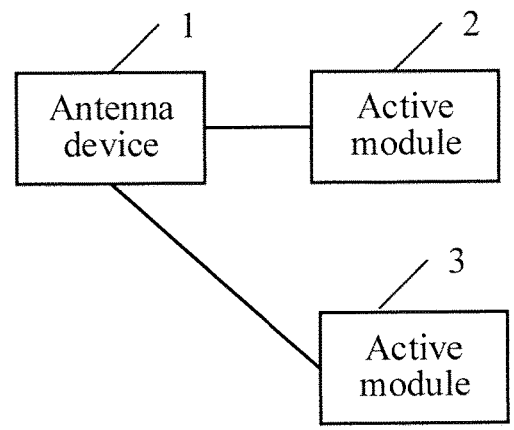
FIG. 1 is a specific schematic constitutional diagram of an antenna system according to an embodiment of the present invention.

As shown in FIG. 1, an antenna system in an embodiment of the present invention is shown. The antenna system includes an antenna device 1. Further, the antenna system may also include an active module 3 and/or a passive module 2.

In the embodiment of the present invention, the active module refers to a module that includes an active circuit, for example, a module that includes a transceiver, an RRU, or a base-band intermediate frequency module belongs to the active module. Accordingly, the passive module is a module that does not include an active circuit, for example, a module that only includes passive circuits such as a phase shifter, a combiner/divider, and a power splitter.

When the antenna system includes the passive module 2, the passive module 2 is connected to a first interface module of the antenna device 1, and may be connected to a network side through a coaxial feeder, for example, may be connected to a non-distributed base station through a coaxial feeder of 1.8 GHz.

When the antenna system includes the active module, the active module 3 is connected to a second interface module of the antenna device 1, and may be connected to other devices through a base-band interface, for example, may be connected to a BBU in a distributed base station through a CPRI interface of 2.1 GHz or a CPRI interface of 2.6 GHz.

It should be noted that, the composition and function of the first interface module do not substantially differ from those of the second interface module. For example, when the first interface module is not connected to the passive module 2, the first interface module may also be connected to the active module 1, and when the second interface module is not connected to the active module 1, the second interface module may also be connected to the passive module 2.

Definitely, one antenna system may include multiple active modules or passive modules, in this manner, the antenna device needs to include a corresponding number of interface modules, and at the same time, the number of divider ports in a signal multiplexer in the antenna device also needs to correspond to the number of the interface modules. The specific composition of the active module and the passive module as well as relations thereof with the antenna device is to be further illustrated in the subsequent specific embodiments. The specific composition of the antenna device is first described hereunder.

Figure 2:
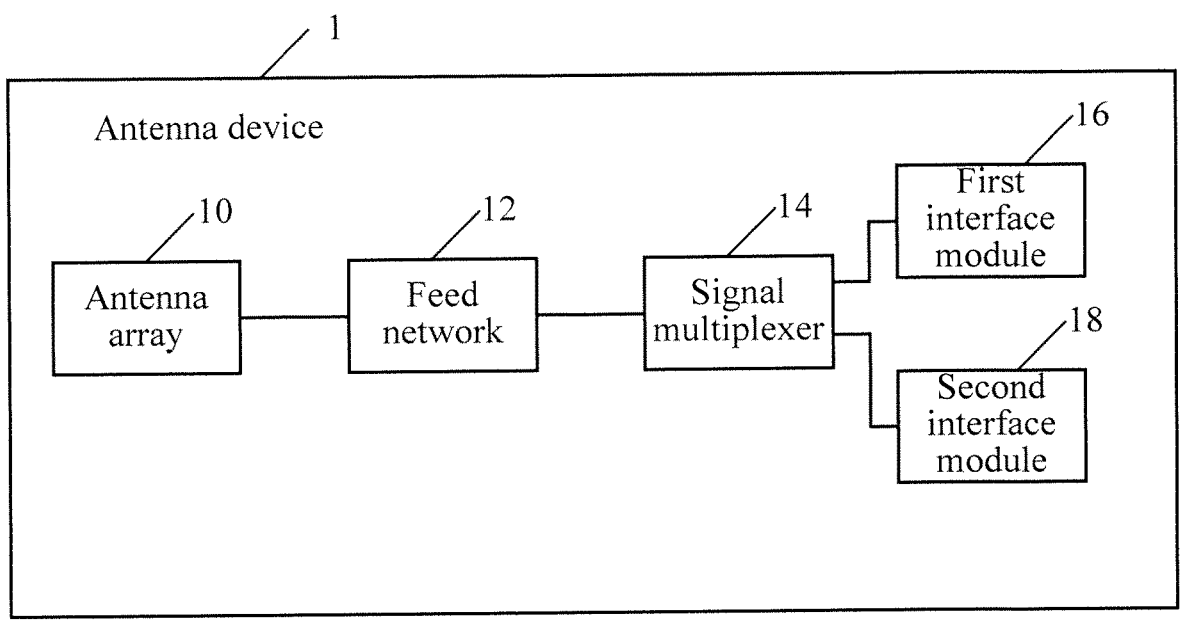
FIG. 2 is a specific schematic constitutional diagram of an antenna device according to an embodiment of the present invention.

As shown in FIG. 2, FIG. 2 is a specific schematic constitutional diagram of an antenna device 1 in an embodiment of the present invention. The antenna device 1 includes: an antenna array 10, configured to radiate or receive an electromagnetic wave signal; a feed network 12, configured to connect the antenna array 10 and a signal multiplexer 14; at least one signal multiplexer 14, where each signal multiplexer, including one combiner port and at least two divider ports, is configured to divide one path of signal from the feed network 12 into at least two paths of signal, or combine at least two paths of signal to one path of signal and transmit the one path of signal to the feed network 12; and at least two interface modules, where each of the interface modules, connected to a passive module or an active module, is configured to receive a signal sent from the passive module or the active module, or send a signal to the passive module or the active module.

The divider ports of each of the signal multiplexer at least include a first port and a second port. The interface modules at least include a first interface module 16 and a second interface module 18. The first port is connected to the first interface module and the second port is connected to the second interface module, so as to send a signal output by the first port, through the first interface module, to the passive module or the active module that is connected to the first interface module, and send a signal output by the second port, through the second interface module, to the passive module or the active module that is connected to the second interface module, or, send, to each signal multiplexer through the first port and the second port, a signal output by the passive module or the active module that is connected to the first interface module and a signal output by the passive module or the active module that is connected to the second interface module.

If it is needed that the antenna device 1 may be externally connected to passive modules and/or active modules having different frequency bands, it is needed that an antenna array may transmit and receive signals having corresponding multiple frequency bands. At this time, the antenna array 10 may include a wideband antenna element. The wideband antenna element is an antenna element which supports receiving or radiating of a wideband signal. The wideband signal may be a signal including two or more frequency bands. Accordingly, the feed network 12 is a wideband feed network. The wideband feed network includes a feed network which supports transmitting of the wideband signal.

Further, the antenna array 10 in the antenna device 1 may include two or more columns of antennas, and also may include a single column of antennas. Each column of antennas includes two or more antenna elements. With respect to the single column of antennas, adjustment of a downtilt of a vertical plane of the antennas may be implemented, and also adjustment of a downtilt of a sub-frequency band may be further implemented. With respect to multiple columns of antennas, in addition to the adjustment of the downtilt of the vertical plane of the antennas and/or the adjustment of the downtilt of the sub-frequency band performed on each column of antennas in the multiple columns of antennas, adjustment of a wave beam of a horizontal plane of the antennas also may be implemented and adjustment of a wave beam of the sub-frequency band may be further implemented.

The foregoing antenna device 1 may be configured for antenna array multiplexing on a vertical plane, also may be configured for antenna array multiplexing on a horizontal plane, and further may be configured for both the antenna array multiplexing on the vertical plane and the antenna array multiplexing on the horizontal plane.

Figure 3:
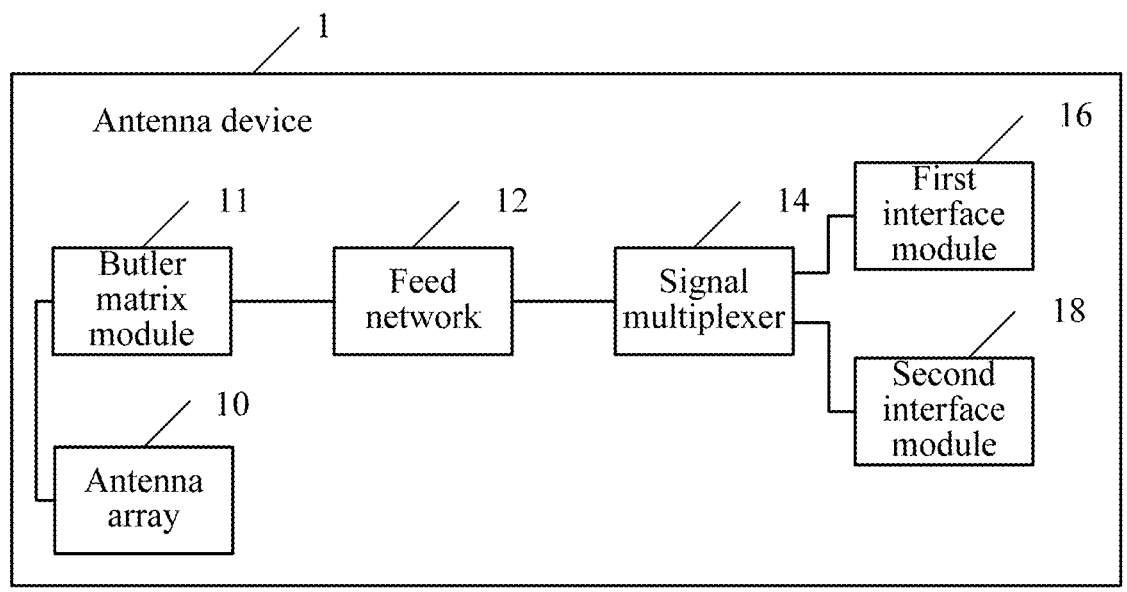
FIG. 3 is a second specific schematic constitutional diagram of an antenna device according to an embodiment of the present invention.

As shown in FIG. 3, when the antenna array 10 in the antenna device 1 includes more than two columns of antennas (referred to as multiple columns of antennas for short), the antenna device may further include a Butler matrix module 11. The Butler matrix module 11, which may be located between the antenna array 10 and the feed network 12 and also may be located between the feed network 12 and the signal multiplexer 14, is configured to form more than two wave beams at a designated direction on the horizontal plane of the wave beam of the antennas, that is, to implement splitting of the antennas.

In addition, the feed network 12 may further include a level-two phase shift network, configured to enhance an adjustment capability of a beam for an active antenna signal or a passive antenna signal.

Figure 4:
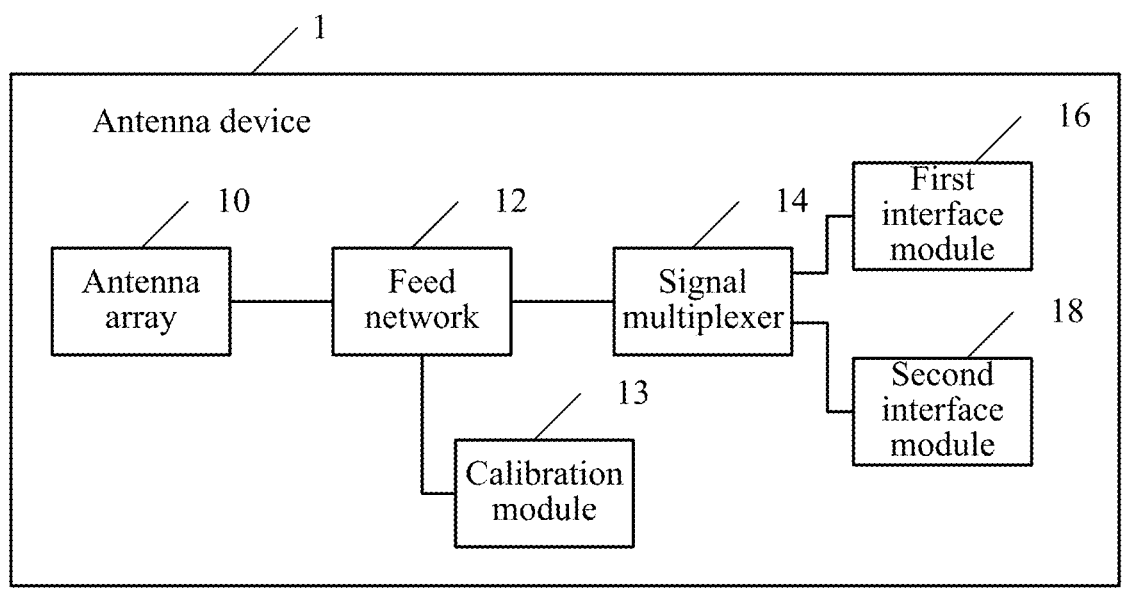
FIG. 4 is a third specific schematic constitutional diagram of an antenna device according to an embodiment of the present invention.

As shown in FIG. 4, the antenna device 1 may further include a calibration module 13, configured to calibrate an antenna signal. The calibration module 13 is a portion of a calibration network. The calibration network further includes a calibration channel. The channel may be located inside the antenna device and also may be located in the active module. The calibration module 13 may include a coupler calibration coupler, a calibration multiplexer, and a calibration channel that are connected in sequence. The calibration module transmits a calibration signal between the antenna device and the active module through the calibration channel, and may be configured to calibrate a signal received and transmitted in an active antenna system.

Figure 5:
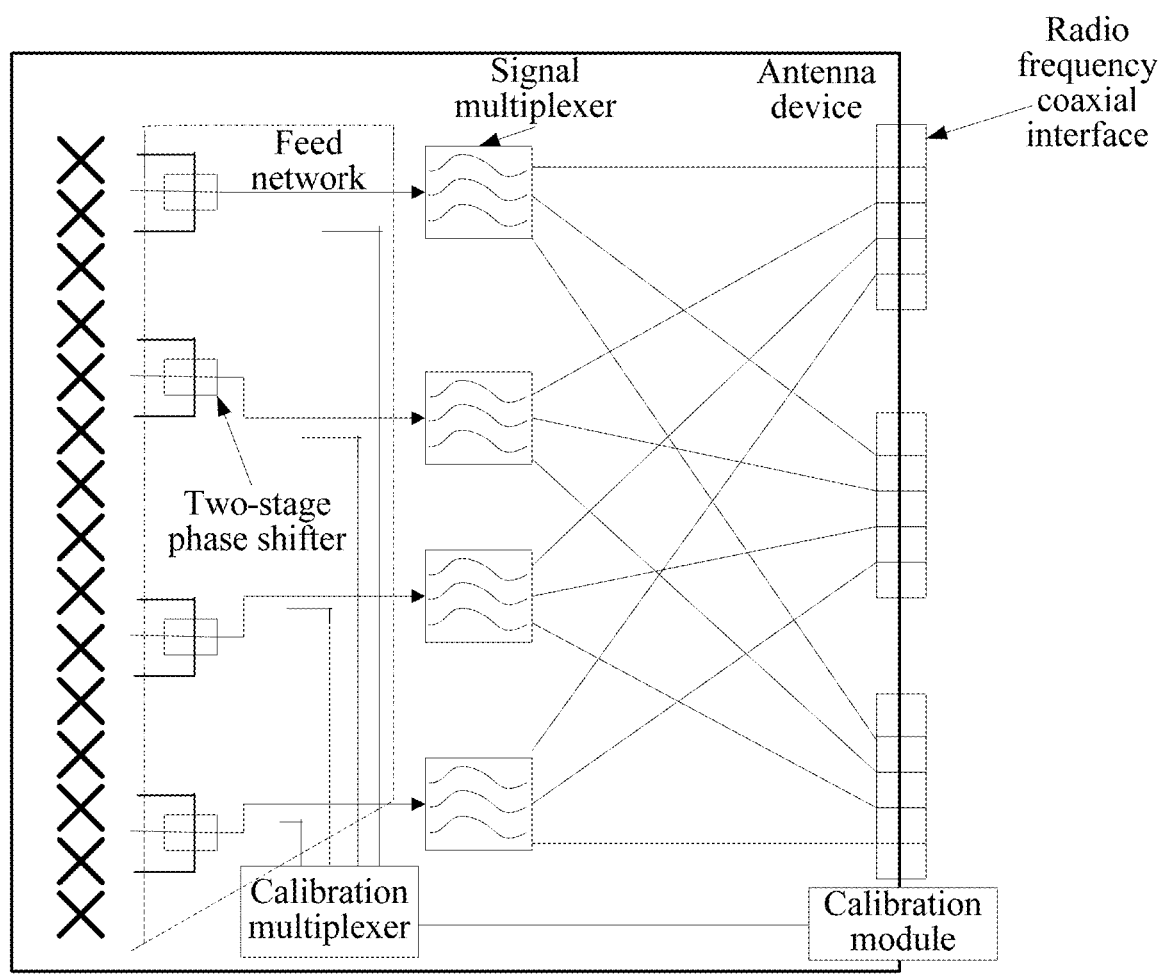
FIG. 5 is a fourth specific schematic constitutional diagram of an antenna device according to an embodiment of the present invention.

When the antenna array 10 implements antenna array multiplexing on a horizontal plane, the antenna array 10 includes multiple columns of antennas. A signal multiplexer and interface modules may be configured for the antenna array multiplexing on the horizontal plane, that is, the signal multiplexer and the interface modules may be disposed horizontally. When the antenna array 10 implements antenna array multiplexing on a vertical plane, the antenna array 10 may include multiple columns of antennas, and also may only include a single column of antennas. The signal multiplexer and the interface modules are configured for antenna array multiplexing on the vertical plane with respect to each column of antennas, that is, the signal multiplexer and the interface modules may be disposed vertically. When the antenna array 10 implements antenna array multiplexing on the horizontal plane and on the vertical plane at the same time, the antenna array 10 includes multiple columns of antennas. Signal multiplexers and interface modules included in the antenna device 1 are in an array form, that is, a portion of the signal multiplexers and the interface modules are disposed horizontally, configured for the antenna array multiplexing on the horizontal plane, and the other portion of the signal multiplexers and the interface modules are disposed vertically, configured for the antenna array multiplexing on the vertical plane. As shown in FIG. 5, an antenna device having four signal multiplexers and three interface modules is taken as an example to further describe the antenna device in the embodiment of the present invention. In this example, the interface modules may specifically be radio frequency coaxial connectors constructed by radio frequency coaxial interfaces. In this manner, three radio frequency coaxial connectors of the antenna device may be respectively connected to a passive module, a first active module, and a second active module, for example, specifically, a passive module of 1.8 GHz, an active module of 2.1 GHz, and an active module of 2.6 GHz.

In FIG. 5, thick solid lines on the left represent an antenna array. The antenna array is configured to radiate an electromagnetic wave and receive an electromagnetic wave. A network between the antenna array and signal multiplexers is a feed network. Each signal multiplexer includes a combiner port and three divider ports, and may be specifically implemented by a resonator combiner. It is understandable that the signal multiplexer may be classified into implementation manners such as two levels of two-in-one combiners, three-in-one combiners, or four-in-one combiners, which are not limited here. In FIG. 5, the rightmost is multiple radio frequency coaxial interfaces. Four radio frequency coaxial interfaces form one radio frequency coaxial connector. Each radio frequency coaxial connector is externally connected to one active or passive module.

In addition, the antenna device in FIG. 5 may further include:

a two-stage phase shifter, where when the number of radio frequency coaxial interfaces is not enough, the active or passive module connected on the right side of the radio frequency coaxial interfaces are incapable of providing a phase value with a sufficient variance for the antenna array, which may result in poor indices of lobe with a presentation of a poor upper secondary lobe or a finite range of a downtilt. The use of the two-stage phase shifter may supplement the antenna array with a better phase variance.

Further, as shown in FIG. 5, the antenna device also may include a calibration coupler (not shown in FIG. 5) and a calibration multiplexer, and also may further include a calibration channel, configured to perform channel calibration on a signal of an active antenna system. The calibration coupler obtains the signal from the active module, and is connected to the calibration channel through the calibration multiplexer to perform channel calibration on the signal from the active module. Alternatively, the calibration channel injects, through the calibration multiplexer and the calibration coupler, a signal to the signal sent to the active module, so as to perform channel calibration on the received signal sent to the active module.

It should be noted that the calibration coupler, the calibration multiplexer, and the calibration channel are needed only when an active module is connected to the antenna device in a form of AAS. If the antenna device is only connected to a passive module, or only connected to an active module in a non-distributed base station form or an RRU form, neither calibration is needed, nor the calibration coupler, the calibration multiplexer, and the calibration channel need to be disposed.

Figure 6:
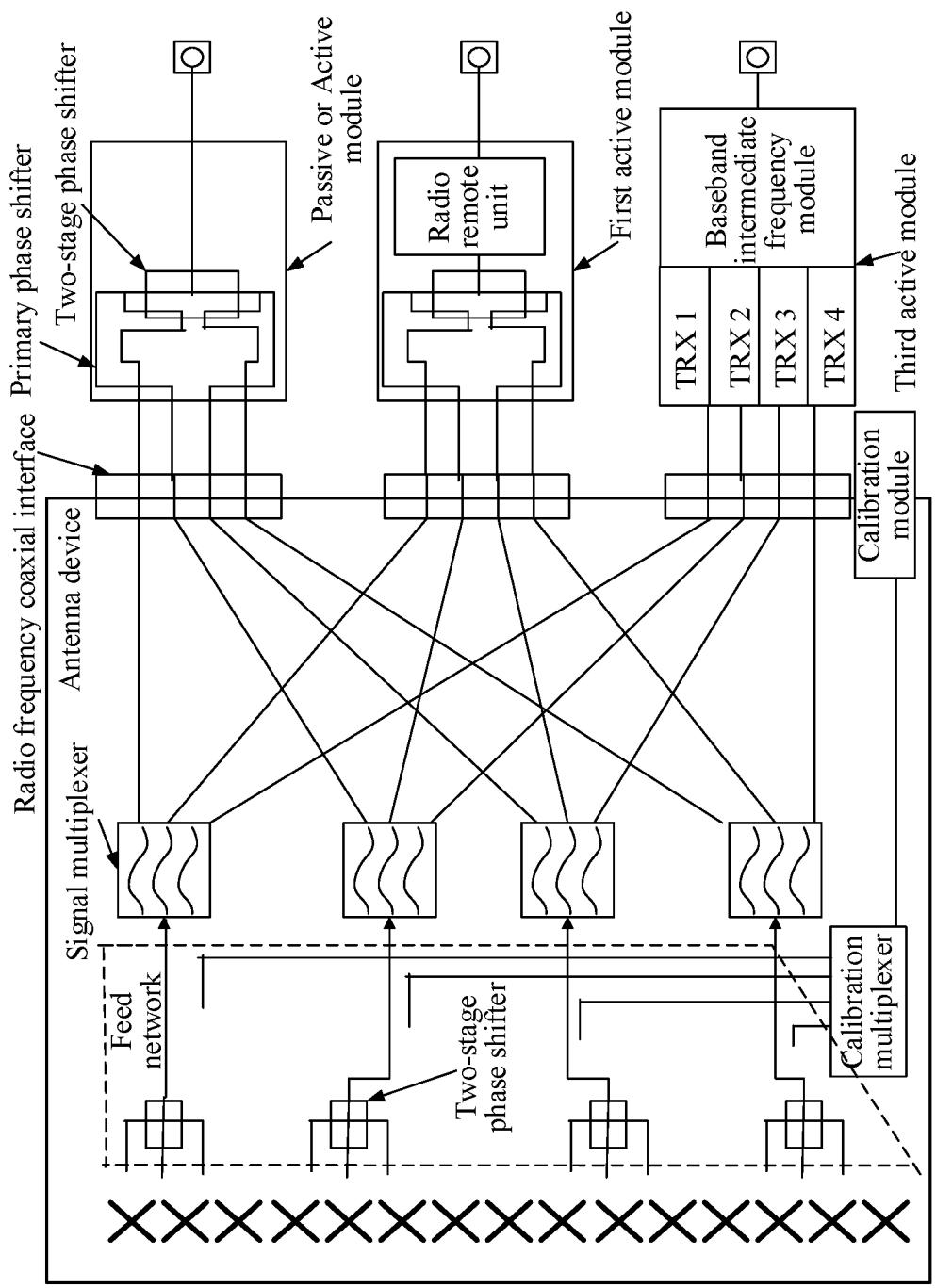
FIG. 6 is a second specific schematic constitutional diagram of an antenna system according to an embodiment of the present invention.

As shown in FIG. 6, a specific schematic diagram of an antenna system constructed when the antenna device in FIG. 5 is externally connected to an active module and a passive module according to an embodiment is shown. In this example, the antenna device is externally connected to one passive module and two active modules through three radio frequency coaxial connectors. The three modules are a passive module, a first active module, and a second active module respectively. The specific composition and function of the three modules are described in the following.

The passive module: the module includes a first primary phase shifter and a coaxial feeder interface. The coaxial feeder interface is configured to exchange a first radio frequency signal with a network side, for example, a non-distributed base station. The first primary phase shifter is configured to perform phase shifting on the first radio frequency signal. The first primary phase shifter may be a passive primary phase shifter. The phase shifter has a function of a combiner/divider of its own. The coaxial feeder interface may be a coaxial connector with a Deutsche industrie normen (DIN) header. Moreover, the other side of the passive module may be connected to the antenna device through a group of radio frequency coaxial interfaces.

Figure 7:
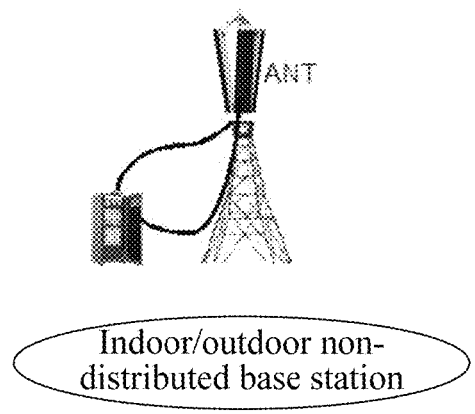
FIG. 7 is a specific schematic constitutional diagram of an antenna system connected to a non-distributed base station according to an embodiment of the present invention.

Accordingly, as shown in FIG. 7, an antenna system including the foregoing passive module in an embodiment of the present invention is shown. In this system, a non-distributed base station (the non-distributed base station may include a base-band processing unit) is placed below a tower, a radio frequency signal is fed to a passive antenna system (that is, a system which includes a passive module of 1.8 GHz and an antenna device) on the tower through a radio frequency coaxial feeder. This case is referred to as a non-distributed base station form.

The first active module: the module includes a first radio frequency unit and a first base-band interface. The first base-band interface is configured to exchange a first digital signal with a base-band unit. The first radio frequency unit is configured to mutually convert the first digital signal and a second radio frequency signal. The first base-band interface may be a common public radio interface (CPRI). The first active module may be connected to a BBU through a fiber. The other side of the first active module is connected to the antenna device through a group of radio frequency coaxial interfaces.

The first radio frequency unit may include a second primary phase shifter and a remote radio unit (RRU), in which, the remote radio unit is configured to mutually convert and process the first digital signal and the second radio frequency signal. The second primary phase shifter is configured to perform phase shifting on the second radio frequency signal. The RRU may be constructed by a transceiver (Transceiver, TRX) and a base-band intermediate frequency module. The TRX performs processing on an analog signal, the base-band intermediate frequency module converts the analog signal to a digital signal, and further processes the digital signal.

Figure 8:
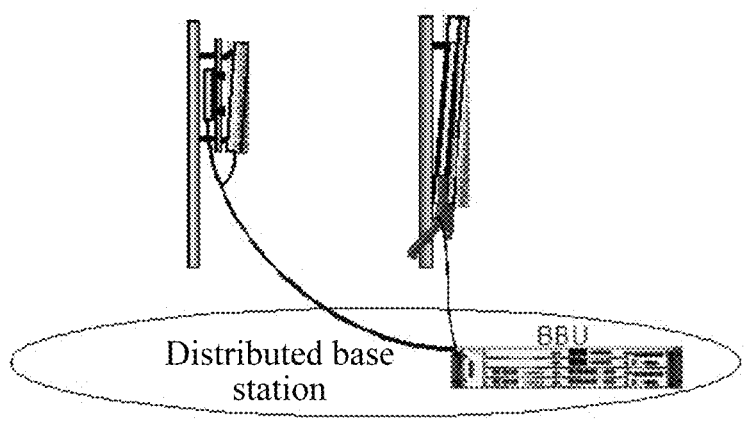
FIG. 8 is a specific schematic constitutional diagram of an antenna system connected to a distributed base station according to an embodiment of the present invention.

Accordingly, as shown in FIG. 8, an antenna system including the foregoing first active module in an embodiment of the present invention is shown. An RRU in the first active module is connected to a BBU in a distributed base station, and the first active module may exchange a signal with the BBU through a fiber or a small signal coaxial cable, where the RRU may be a physically independent RRU, mounted on or below the tower, or may be an RRU module semi-integrated with the antenna device. This case is referred to as an RRU form.

The second active module includes a second radio frequency unit and a second base-band interface. The second base-band interface is configured to exchange a second digital signal between the second active module and the base-band unit. The second radio frequency unit is configured to mutually convert and process the second digital signal and a third radio frequency signal. The second base-band interface may be a common public radio interface (CPRI). The second active module may be connected to the BBU through a fiber. The other side of the second active module is connected to the antenna device through a group of radio frequency coaxial interfaces.

The second radio frequency unit may include a TRX module and a base-band intermediate frequency module. The transceiver module is configured to convert the third radio frequency signal and a second intermediate frequency signal. The base-band intermediate frequency unit is configured to mutually convert and process the second intermediate frequency signal and the second digital signal. In the embodiment of the present invention, the TRX module may be constructed by a TRX array to process a radio frequency signal. The base-band intermediate frequency module performs analog-to-digital conversion, and further performs a digital signal.

Figure 9:
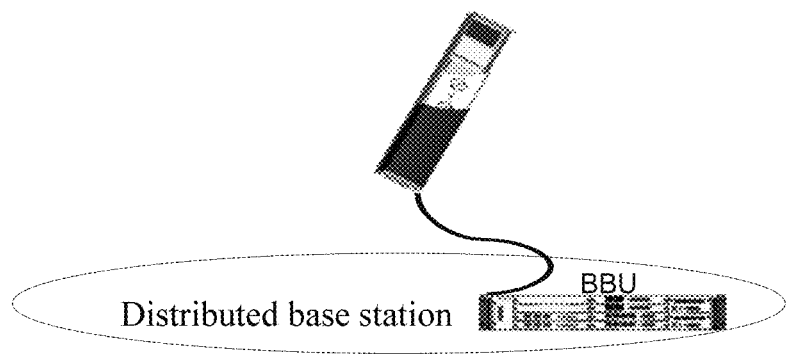
FIG. 9 is another specific schematic constitutional diagram of an antenna system connected to a distributed base station according to an embodiment of the present invention.

Correspondingly, as shown in FIG. 9, an antenna system including the foregoing second active module in an embodiment of the present invention is shown. In this system, the TRX module in the second active module includes a TRX array. The TRX array may process multiple subcomponents of one signal or process different signals according to requirements, and when processing multiple subcomponents of one signal, the TRX array may adjust amplitudes and phases for the multiple subcomponents separately, so as to achieve a function of lobe shaping. When different signals are processed, amplitudes and phases of the different signals may be adjusted separately, so as to achieve a function of space diversity. This case is referred to as an AAS form.

In this way, the antenna device in the embodiment of the present invention may support a smooth evolution and expansion of operators by externally connecting different modules, and implement sharing of antenna resources of the active antenna and the passive antenna.

Figure 10:
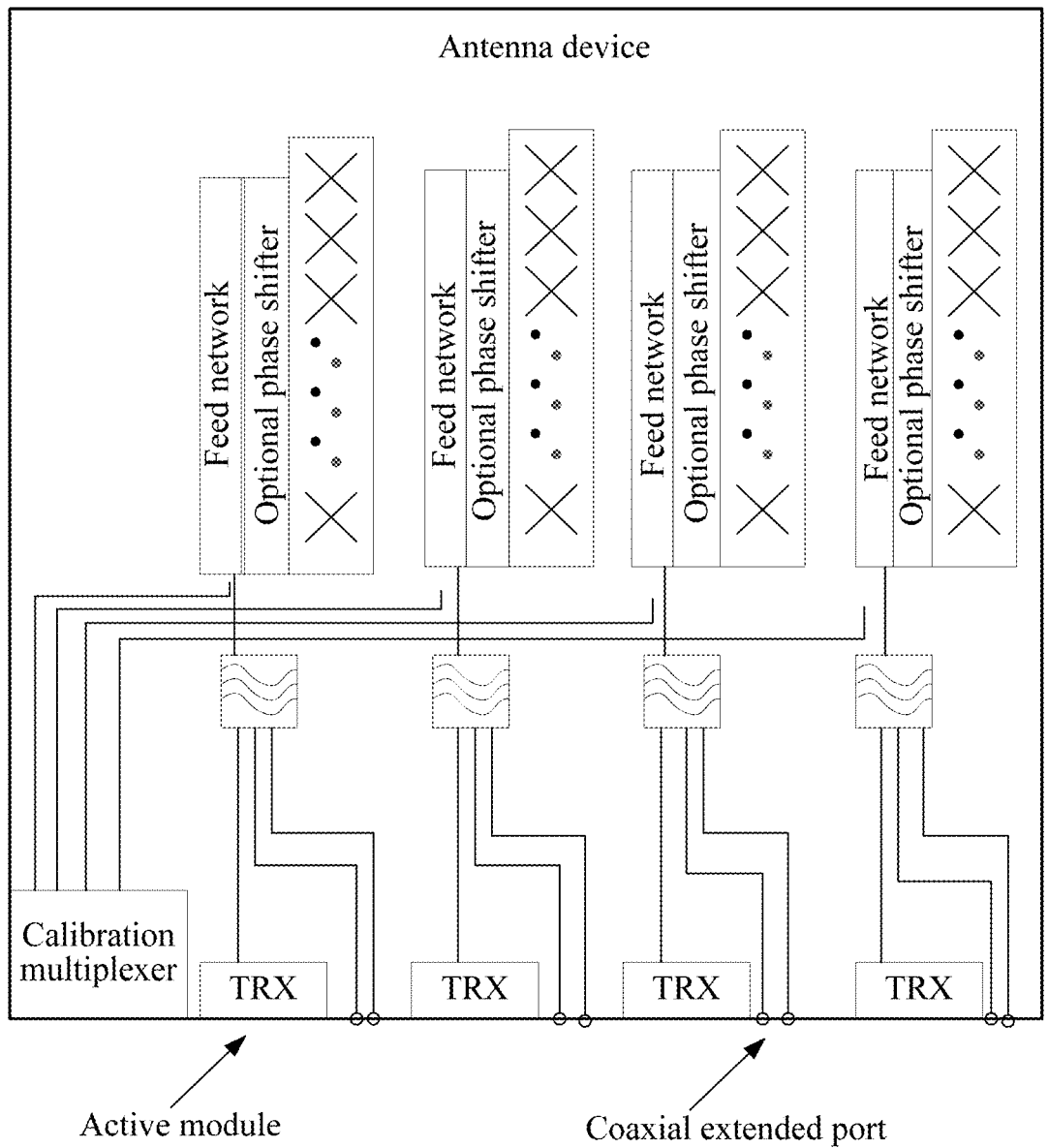
FIG. 10 is a specific schematic constitutional diagram of an antenna device having multiple columns of antenna arrays according to an embodiment of the present invention.

As shown in FIG. 10, a schematic constitutional diagram of an antenna device including multiple columns of antennas in an embodiment of the present invention is shown. In the embodiment of the present invention, the antenna device may include a signal multiplexer, an interface module (for example, a radio frequency coaxial connector including a group of radio frequency coaxial interfaces), a feed network, and the like, and may further include a calibration module. In this example, the signal multiplexer and the interface module are configured for antenna array multiplexing on a horizontal plane. One group of radio frequency coaxial interfaces is connected to a TRX array. The other two groups of radio frequency coaxial interfaces are extended portions of the interfaces, for example, coaxial extended interfaces, which may be connected to a passive module or an active module. In this schematic diagram, radio frequency coaxial interfaces connected to the same active module or passive module are not drawn in the same group. However, persons skilled in the art should understand that, when actual connecting is performed, corresponding radio frequency coaxial interfaces connected to a different signal multiplexer are regarded as one group, that is, one radio frequency coaxial connector, connected to an external module.

Likewise, the antenna device also may support the smooth evolution and expansion of the operators. For example, in an application scenario that only an antenna signal of 2.6 GHz is needed, the foregoing coaxial extended interfaces may be directly connected to matched load. The antenna device, together with the TRX array to which the antenna device is connected, serving as an active antenna system, has an active antenna capability of a frequency band of 2.6 GHz. When it is necessary to satisfy an application scenario of 1.8 GHz or 2.1 GHz, according to different scenarios and a wave beam width on an horizontal plane of the antenna, the needed number of columns of antennas may be selected, and a passive power splitter network module or an active transceiver module may be added at a corresponding location of the radio frequency coaxial interface.

Figure 11:
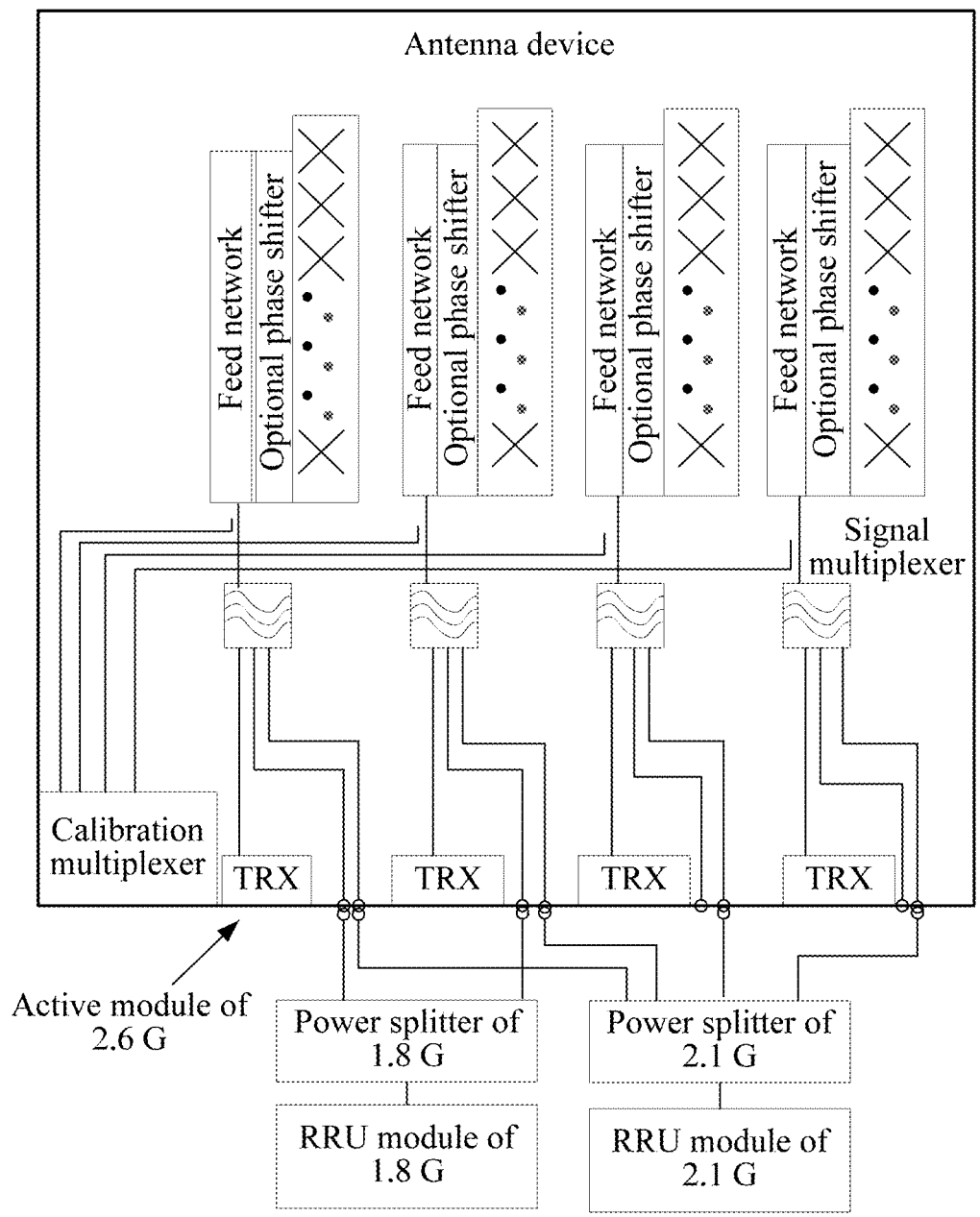
FIG. 11 is a specific schematic constitutional diagram of an antenna device having multiple columns of antenna arrays when the antenna device is externally connected to an active or a passive module according to an embodiment of the present invention.

As shown in FIG. 11, an RRU module of 1.8 GHz is divided into two paths through a power splitter of 1.8 GHz and is connected to two columns of antennas through coaxial extended interfaces and signal multiplexers, so as to form horizontal wave beams with a width and a direction needed by the 1.8 G. An RRU module of 2.1 GHz is connected to four columns of antennas through a four-path power splitter network of a power splitter of 2.1 GHz and through coaxial extended interfaces and signal multiplexers, so as to form horizontal wave beams with a direction needed by the 2.1 G.

Figure 12:
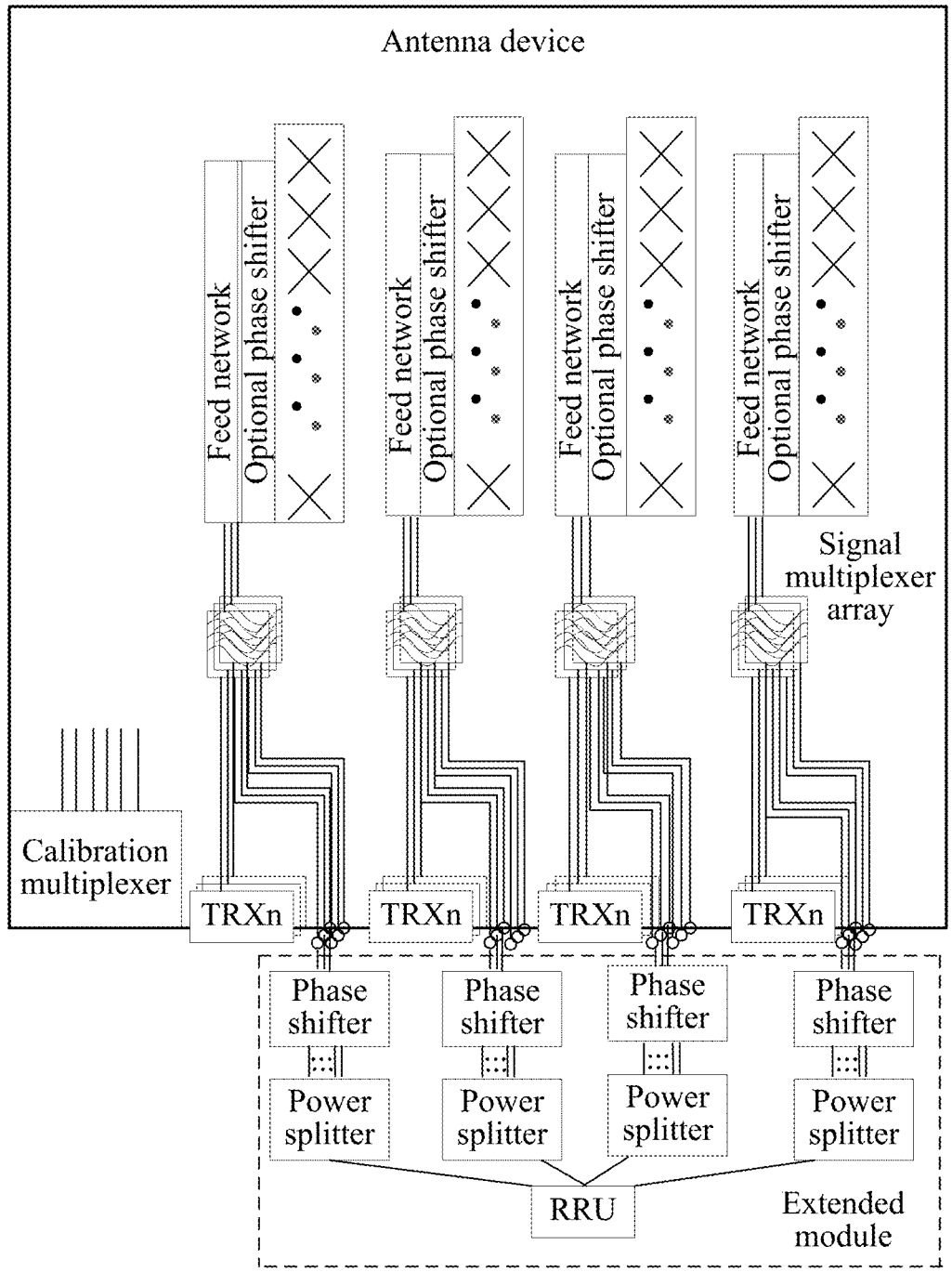
FIG. 12 is a specific schematic constitutional diagram of an antenna device having multiple columns of antenna arrays and supporting adjustments at a horizontal plane and vertical plane simultaneously according to an embodiment of the present invention.

The antenna device of an example shown in FIG. 12 can support adjustment on a horizontal plane and adjustment on a vertical plane at the same time. The antenna device may include an antenna array, a signal multiplexer array, a radio frequency coaxial connector array, a feed network (which may include a two-stage phase shifter), and the like, and also may include a calibration module.

A portion of the radio frequency coaxial connector array is connected to a TRX array to form an active antenna system. In one column, n TRXis (the value of i is from 1 to n) drive all antenna elements in the column through the feed network and change a downtilt of the column of antennas by changing amplitude and phase attributes. Meanwhile, in multiple columns of the antenna array, a horizontal wave beam of the antennas may be adjusted by controlling amplitudes and phases of the TRXs. This type of antenna device may support flexible adjustment of wave beams on the horizontal plane and on the vertical plane at the same time. Other reserved radio frequency coaxial interfaces may extend an active module or a passive module of other frequency bands.

When a radio frequency coaxial interface not connected to a TRX is externally connected to an extended module, in order to have a downtilt adjustment function similar to that of an active antenna, an RRU may be connected to each corresponding port through a power splitter phase shift network (including a power splitter and a phase shifter).

Figure 13:
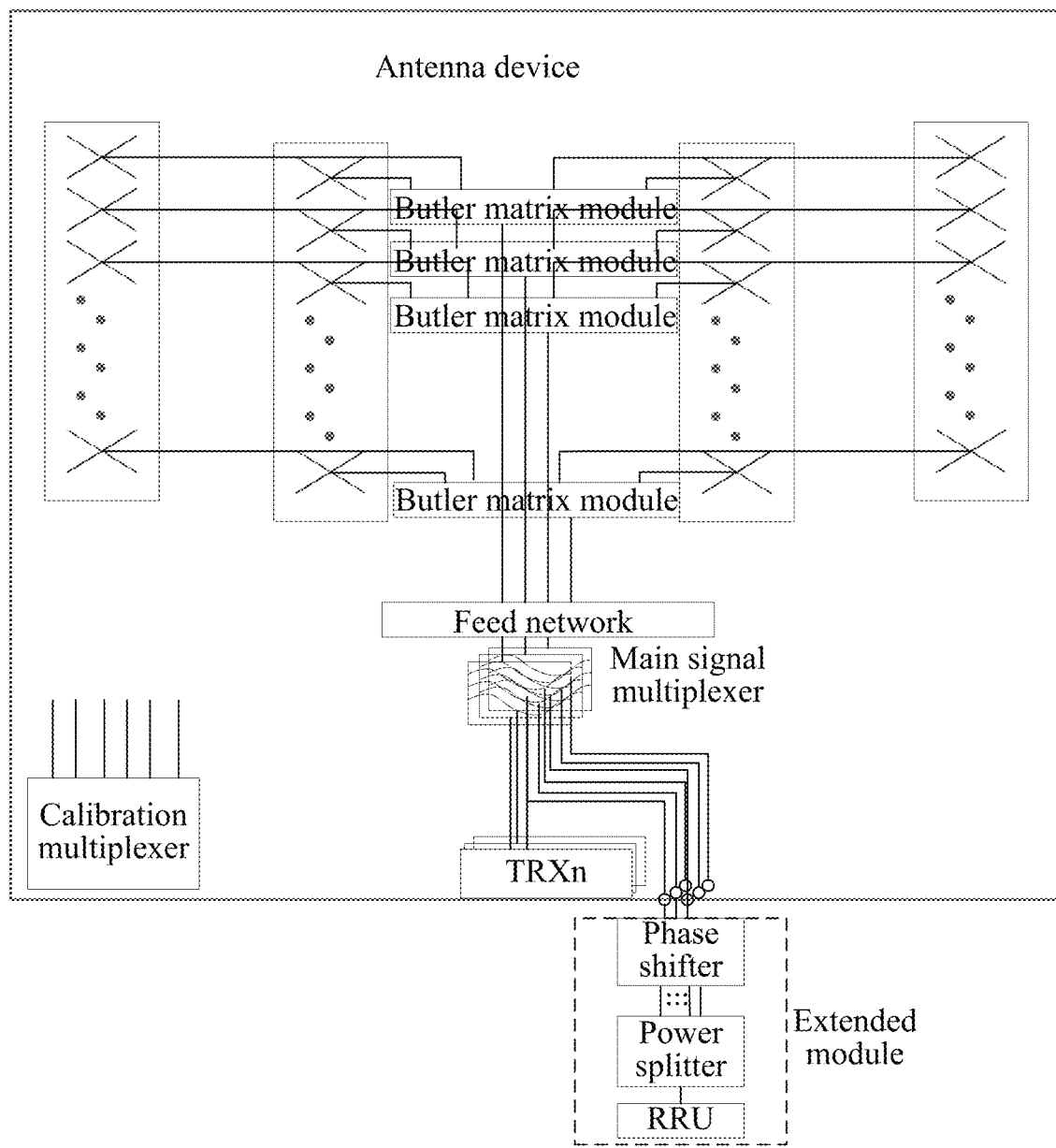
FIG. 13 is a specific schematic constitutional diagram of an antenna device having multiple columns of antenna arrays and having a Butler matrix module according to an embodiment of the present invention.

Sharing of multiple columns of antenna units may not only include sharing of the feed network, but also include sharing of Butler matrix that splitting needs, as shown in FIG. 13.

It may be known from the foregoing description that, the antenna device in the embodiment of the present invention may be connected to base stations of multiple forms, for example, a non-distributed base station, an RRU, or an AAS. Active and passive modules in different frequency bands or different forms all may share the antenna device.

When the antenna device is shared, through proper design, downtilts may be adjusted at the same time, wave beams on the horizontal plane may be adjusted at the same time (including splitting at the same time), the downtilts may be adjusted independently, or the wave beams on the horizontal plane may be adjusted independently.

By sharing the antenna device, sharing of the station, the iron tower, and the antenna (antenna) may be implemented, thereby saving construction costs and operation costs (rents) for operators. In a process when an operator upgrades and removes a base station antenna, an original non-distributed base station which is still running normally and is not expected to be thrown away may be connected to the present antenna module through a DIN header or a passive module, so as to protect historical investment of the operator.

Persons skilled in the art should understand that all or a part of the functions of the apparatus according to the embodiments may be implemented by a computer program instructing relevant hardware. The program may be stored in a computer readable storage medium. When the program is run, the program may include the functions of the apparatus in the embodiments. The storage medium may be a magnetic disk, an optical disk, a read-only memory (ROM), a random access memory (RAM), and the like.

Disclosed above are merely exemplary embodiments of the present invention, but are not intended to limit the scope of the present invention. Therefore, equivalent variations made according to the claims of the present invention shall fall within the protection scope of the present invention.

What is claimed is:

1. An antenna system comprising an antenna device, the antenna device comprising:
   an antenna array, configured to radiate and receive an electromagnetic wave signal;
   a feed network, configured to connect the antenna array and a signal multiplexer;
   at least one signal multiplexer, wherein each signal multiplexer, comprising a combiner port and at least two divider ports, is configured to divide one path of signal from the feed network into two paths of signal, or combine at least two paths of signal to one path of signal and transmit the one path of signal to the feed network; and
   at least two interface modules, wherein each of the interface modules, connected to an active module, is configured to receive a signal sent from the active module, and send a signal to the active module; and, wherein
   the divider ports of each signal multiplexer at least comprise a first port and a second port; and
   the interface modules at least comprise a first interface module and a second interface module, wherein
   the first port is connected to the first interface module and the second port is connected to the second interface module, facilitate:
      sending a signal output by the first port, through the first interface module, to the active module that is connected to the first interface module, and sending a signal output by the second port, through the second interface module, to the active module that is connected to the second interface module; and,
   wherein the antenna system further comprises:
   a third active module connected to a third interface module of the antenna device, wherein the third active module comprises a radio frequency unit and a base-band interface, the base-band interface is configured to exchange a digital signal between the third active module and a base-band unit, and the radio frequency unit is configured to mutually convert and process the digital signal and a radio frequency signal, wherein
   the radio frequency unit comprises a transceiver module and a base-band intermediate frequency unit, wherein the transceiver module is configured to convert the radio frequency signal and a intermediate frequency signal, and the base-band intermediate frequency unit is configured to mutually convert and process the intermediate frequency signal and the digital signal.

2. The antenna system according to claim 1, further comprising a first active module, which is the active module, connected to a first interface module of the at least two interface modules, wherein
   the first active module comprises a first radio frequency unit and a first base-band interface, wherein the first base-band interface is configured to exchange a first digital signal with a base-band unit, and the first radio frequency unit is configured to mutually convert the first digital signal and a first radio frequency signal.

3. The antenna system according to claim 2, wherein the first radio frequency unit comprises a primary phase shifter and a radio remote unit, the radio remote unit is configured to mutually convert and process the first digital signal and the first radio frequency signal, and the primary phase shifter is configured to perform phase shifting on the first radio frequency signal.

4. An antenna system comprising an antenna device, the antenna device comprising:
   an antenna array, configured to radiate and receive an electromagnetic wave signal;
   a feed network, configured to connect the antenna array and a signal multiplexer;
   at least one signal multiplexer, wherein each signal multiplexer, comprising a combiner port and at least two divider ports, is configured to divide one path of signal from the feed network into two paths of signal, or combine at least two paths of signal to one path of signal and transmit the one path of signal to the feed network; and
   at least two interface modules, wherein each of the interface modules, connected to an active module, is configured to receive a signal sent from the active module, and send a signal to the active module; and, wherein
   the divider ports of each signal multiplexer at least comprise a first port and a second port; and
   the interface modules at least comprise a first interface module and a second interface module, wherein
   the first port is connected to the first interface module and the second port is connected to the second interface module, facilitate:
   sending, to each signal multiplexer through the first port and the second port, a signal output by the active module that is connected to the first interface module and a signal output by the active module that is connected to the second interface module; and, wherein the antenna system further comprises:
   a third active module connected to a third interface module of the antenna device, wherein the third active module comprises a radio frequency unit and a base-band interface, the base-band interface is configured to exchange a digital signal between the third active module and a base-band unit, and the radio frequency unit is configured to mutually convert and process the digital signal and a radio frequency signal, wherein
   the radio frequency unit comprises a transceiver module and a base-band intermediate frequency unit, wherein the transceiver module is configured to convert the radio frequency signal and a intermediate frequency signal, and the base-band intermediate frequency unit is configured to mutually convert and process the intermediate frequency signal and the digital signal.

5. The antenna system according to claim 4, further comprising a first active module, which is the active module, connected to a first interface module of the at least two interface modules, wherein
   the first active module comprises a first radio frequency unit and a first base-band interface, wherein the first base-band interface is configured to exchange a first digital signal with a base-band unit, and the first radio frequency unit is configured to mutually convert the first digital signal and a first radio frequency signal.

6. The antenna system according to claim 4, wherein the first radio frequency unit comprises a primary phase shifter and a radio remote unit, the radio remote unit is configured to mutually convert and process the first digital signal and the first radio frequency signal, and the primary phase shifter is configured to perform phase shifting on the first radio frequency signal.

* * * * *